Patented Sept. 13, 1927.

1,642,588

UNITED STATES PATENT OFFICE.

LEON LILIENFELD, OF VIENNA, AUSTRIA.

PROCESS FOR THE MANUFACTURE OF ARTIFICIAL MATERIALS.

No Drawing. Application filed July 23, 1924, Serial No. 727,800, and in Austria April 4, 1924.

In the industry of artificial materials there is an undesirable deficiency, owing to the absence of a process which renders it possible to work up solutions of cellulose derivatives in aqueous solvents by merely drying, or heating or steaming, into technical products insoluble in water which, without being washed, do not deteriorate in their quality and in their appearance in the course of time.

By the present invention, a transparent, lustrous, flexible artificial material which does not become unsightly or useless in the course of time due to precipitation or crystallization may be obtained by a simple drying process by using a solution in a suitable aqueous liquid of a product obtained by acting on a cellulose-xanthic acid or a cellulose-xanthate (viscose) with a mono-halogen derivative of a fatty acid.

According to the mode of their formation and to their composition, these products (which may be prepared for instance by the process described in my copending application No. 727,807), are cellulose-xantho-fatty acids, (cellulose-thion-thiol-carbon-hydroxy-paraffin-monocarboxylic acids) that is to say, compounds which are derived from fatty acids by replacing a hydrogen atom united with carbon for a cellulose-xanthic acid residue, irrespective of whether the cellulose component of the cellulose xanthic acid is cellulose, or a conversion product or derivative thereof. The parent materials for the present process will therefore be termed cellulose-xantho-fatty acids, by which expression shall also be understood the salts of these compounds, particularly the salts with an alkali metal.

The process consists in the first place in dissolving a cellulose-xantho-fatty acid, for instance cellulose-xanthacetic acid, or a salt thereof, such as a salt with an alkali metal, either in water itself (in so far as the substance is soluble in water) or in an aqueous solution of a suitable liquid or volatile inorganic or organic base (for instance, ammonia, or a primary, secondary or tertiary amine, of the aliphatic or aromatic series, or a poly-amine, or a quaternary base of acylic or of cyclic structure, or a member of the guanidine, pyridine, or quinoline group); this solution or paste is then, either alone or mixed with another colloid, with a softening material, with a filling material, or with a dyestuff or pigment, brought into the form in which it is desired to produce the artificial material and dried. Even very dilute solutions of the bases referred to are sufficient to dissolve the cellulose-xantho-fatty acid, for instance cellulose-xanthacetic acid. For example, it may be mentioned that as solvents there may even be used an ammonia solution of 0.01–0.05 per cent strength or a solution of aniline of 0.25–0.5 per cent strength. Care must often be taken in the case of bases which retain hydrogen atoms on the ammonia group that the concentration of the solution is not too great, since solutions of a cellulose-xantho-fatty acid in a strong solution of such a base coagulates or gelatinizes sooner or later according to the concentration of the said solution. By selecting solutions of lower concentration, the gelatinization or coagulation may be suppressed entirely, or at least retarded to such an extent that no difficulty is experienced in working up the solution into artificial material. Solutions of a cellulose-xantho-fatty acid in an aqueous solution of a base containing no exchangeable hydrogen atoms in the ammonia group, as for instance pyridine, do not coagulate spontaneously even when the solution of the base is more concentrated.

To the solution of the cellulose-xantho-fatty acid in a volatile base, there may also be added a small or large quantity of a non-volatile or less volatile base, such as a quaternary base; a base whose aqueous solution is supposed to contain a highly electrolytically dissociated hydroxide, for example guanidine; a high boiling homologue of pyridine; a hydrogenated pyridine such as piperidine; a high-boiling member of the quinoline group, for instance isoquinoline; or a member of the urea class, for instance a small quantity of urea or thio-urea, or the like.

The solution of the cellulose-xantho-fatty acid may be converted into artificial material by drying at atmospheric or reduced pressure, in the cold, or with heating. In this way there may be obtained lustrous, transparent, flexible layers, skins, plates, or the like, in short, artificial material, insoluble in water.

The finished products may be submitted to a subsequent treatment with a suitable softening agent such as glycerine, polyglycerine, glycol, sugar, syrup, or soap, by immersing it or soaking it in, or coating it with the agent.

The following substances are mentioned as examples of colloids or softening agents suitable for addition to the cellulose-xantho-fatty acid: albuminous substances, glue, (gelatin), amyloid, starch and starch-like substances, dextrin, gums (gum arabic, tragacanth or the like), tragasol, glycerine, diglycerine, polyglycerine, glycols, sugars and syrups, soaps, fats, oils, ammonium or alkali metal compounds of fatty sulphonic acids, such as Turkey-red oil, and the like.

The cellulose-xantho-fatty acids are suitable for the following purposes: for the production of coatings and layers of all kinds; for producing finishes insoluble in water, on fabric, paper, leather or the like; as a sizing material for spun goods; for the manufacture of book cloth; for the manufacture of artificial leather; for the manufacture of glues and cements; as a thickening or fixing agent for pigments in textile printing; for the manufacture of plates and plastic masses in general; for the manufacture of artificial thread, especially artificial silk.

The expression "artificial material" used in the description and claims includes all the artificial materials referred to in the preceding paragraph.

The following examples illustrate the invention, the parts being by weight:

I. Production of films.

1. A freshly prepared and washed water-soluble cellulose-xanthacetic acid (cellulose thion-thiol-carbon-glycollic acid), prepared for instance according to the method described in Examples 1 or 3 of my copending application No. 727,807, is dissolved in the water remaining in it from the washing process by warming it on the water bath and stirring. This solution is filtered or strained if necessary, and is worked into the form of a film, either by itself or after addition of a material which renders it pliable, (for instance, a little glycerin or polyglycerin) on a suitable coating table or by means of a suitable coating machine in known manner by drying, and subsequent removal from the support. The complete film may afterwards be steamed or heated in order to reduce the tendency to swell in presence of water. It may also be bathed in an aqueous solution of aniline or toluidine, for instance of 2-3 per cent strength, or it may be impregnated in a dilute solution of aniline or toluidine, and again dried.

2. 6 parts of a cellulose-xanthacetic acid or a cellulose-xantho-α-propionic acid, prepared for example as described in my copending case above referred to, and soluble in dilute solutions of bases, are dissolved in 90-100 parts of an aqueous solution of aniline of 0.25-0.5 per cent strength, whilst stirring or kneading, and the solution worked into a film as in Example 1.

3. The procedure is as in Example 2, with the exception that instead of the aniline solution there is used as solvent an aqueous solution of ammonia of 0.02-0.04 per cent strength.

4. The procedure is as in Example 2 or 3 with the exception that the solvent used is an aqueous solution of pyridine of 3-15 per cent strength.

II. Finishing of textile materials.

5. A vegetable or animal textile fabric is coated one or more times by means of a suitable apparatus with any of the solutions used in Examples 1-4, preferably with the addition of a filling material, for example, zinc white, china clay or talc, and dried. After drying, the material may be subjected to a subsequent heat treatment, or it may be steamed, or washed or soaked in an aqueous solution of aniline or toluidine, and dried.

6. The procedure is as in Example 5, with the exception that there is added to the solution a softening agent such as Turkey-red oil, or a drying or non-drying oil, or a soap.

7. The procedure is as in Example 5 or 6, with the exception that the solution is mixed with a solution of starch. The finished or coated material may be satined, or calendered, or provided with a pattern, or glazed by pressing by means of riffled or patterned rollers.

III. Textile printing.

8. 100 parts of a solution prepared as described in Example 1, 2, 3 or 4, are mixed with 4-6 parts of a dyestuff lake, or with 4-6 parts of finely powdered mica, or with 4-6 parts of zinc white or lithopone, or with 2-3 parts of soot, or with 4-6 parts of powdered aluminium, printed on a cotton fabric, if necessary after a preliminary grinding in a colour-grinding mill, and dried.

After drying, the printed fabric may subsequently be heated, or steamed, or bathed in, or impregnated with an aqueous solution of aniline or toluidine, and dried.

IV. Book cloth.

9. A textile material, preferably porous, such as calico, receives one or more coatings of one of the solutions as used in Examples 1-4 (if desired with the addition of zinc-white, china-clay, finely divided cellulose fibre, soot, a dyestuff lake, mica, or a dyestuff), until the pores of the textile are completely filled. If the fabric is given more than one coating, it is dried after the application of each coating. The material may be calendered after each coating, or after the final coating, and either in the cold or at a raised temperature. After the impregnation the material may be heated, or steamed, or bathed in, or impregnated with an aqueous solution of aniline or toluidine, and dried.

The finished book-binder's cloth may. be provided with any desired pattern or grain by pressing between plates or by embossing by means of patterned rollers, or the like.

V. Sizing for paper.

10. A solution as used in any of the Examples 1–4, is mixed with the half-stuff and precipitated in known manner in solid form on the fibre by means of aluminium sulphate.

VI. Artificial threads.

11. A solution as used in any of the Examples 1–4 is spun through a fine orifice, and the issuing thread is dried, for example, in a current of heated air. After drying, the finished thread may be heated, or steamed, or soaked in, or impregnated with an aqueous solution of aniline or toluidine, and dried.

The artificial materials prepared according to the foregoing examples may be washed, if desired.

I claim:

1. A process for producing artificial materials which comprises bringing a solution of a cellulose-xantho-fatty acid in an aqueous liquid into the form of an artificial material and thereafter treating it so as to produce separation of solid therefrom.

2. A process for producing artificial materials which comprises bringing a solution of a cellulose-xanthacetic acid in an aqueous liquid into the form of an artificial material and thereafter treating it so as to produce separation of solid therefrom.

3. A process for producing artificial materials which comprises bringing a solution of a cellulose-xantho-fatty acid in an aqueous solution of a basic substance into the form of an artificial material and thereafter treating it so as to produce separation of solid therefrom.

4. A process for producing artificial materials which comprises bringing a solution of a cellulose-xanthacetic acid in an aqueous solution of a basic substance into the form of an artificial naterial and thereafter treating it so as to produce separation of solid therefrom.

5. A process for producing artificial materials which comprises bringing a solution of a cellulose-xantho-fatty acid and another colloid in an aqueous liquid into the form of an artificial material and thereafter treating it so as to produce separation of solid therefrom.

6. A process for producing artificial materials which comprises bringing a solution of a cellulose-xantho-fatty acid and another colloid in an aqueous solution of a basic substance into the form of an artificial material and thereafter treating it so as to produce separation of solid therefrom.

7. A process for the manufacture of artificial materials which comprises bringing a solution of a cellulose-xantho-fatty acid in an aqueous liquid into the form of an artificial material and drying this material.

8. A process for the manufacture of artificial materials which comprises bringing a mixture containing a cellulose-xantho-fatty acid and water into the form of an artificial material and drying this material.

9. A process for the manufacture of artificial materials which comprises bringing a solution of a cellulose-xantho-fatty acid in an aqueous solution of ammonia into the form of an artificial material and drying this material.

10. A process for the manufacture of artificial materials which comprises bringing a solution of a cellulose-xantho-fatty acid in an aqueous solution of a base into the form of an artificial material and drying this material.

11. A process for the manufacture of artificial materials which comprises bringing a solution of a cellulose-xantho-fatty acid in an aqueous solution of a nitrogen containing base into the form of an artificial material and drying this material.

12. A process for the manufacture of artificial materials which comprises bringing a solution of a cellulose-xantho-fatty acid in an aqueous solution of a base containing trivalent nitrogen into the form of an artificial material and drying this material.

13. A process for the manufacture of artificial materials which comprises bringing an aqueous solution of a cellulose-xanthacetic acid into the form of an artificial material and drying this material.

14. A process for the manufacture of artificial materials which comprises bringing a solution of a cellulose-xanthacetic acid in an aqueous solution of ammonia into the form of an artificial material and drying this material.

15. A process for the manufacture of artificial materials which comprises bringing a solution of a cellulose-xanthacetic acid in an aqueous solution of a base into the form of an artificial material and drying this material.

16. A process for the manufacture of artificial materials which comprises bringing a solution of a cellulose-xanthacetic acid in an aqueous solution of a nitrogen containing base into the form of an artificial material and drying this material.

17. A process for the manufacture of artificial materials which comprises bringing a solution of a cellulose-xanthacetic acid in an aqueous solution of a base containing trivalent nitrogen into the form of an artificial material and drying this material.

18. A process for the manufacture of artificial materials which comprises adding to a solution of a cellulose-xantho-fatty acid in an aqueous liquid a softening agent, bringing it into the form of an artificial material and drying this material.

19. A process for the manufacture of artificial materials which comprises bringing a solution of a cellulose-xantho-fatty acid in an aqueous liquid into the form of an artificial material, drying this material and subsequently heating it.

20. A process for the manufacture of artificial materials which comprises bringing a solution of a cellulose-xantho-fatty acid in an aqueous liquid into the form of an artificial material, drying this material and steaming it.

21. A process for the manufacture of artificial materials which comprises bringing a solution of a cellulose-xantho-fatty acid in an aqueous liquid into the form of an artificial material, drying this material and washing it.

22. A process for the manufacture of artificial materials which comprises bringing a solution of a cellulose-xantho-fatty acid in an aqueous liquid into the form of an artificial material, drying this material, subsequently heating it, and washing it.

23. A process for the manufacture of artificial materials which comprises bringing a solution of a cellulose-xantho-fatty acid in an aqueous liquid into the form of an artificial material, drying this material, subsequently steaming it, and washing it.

24. The process of producing artificial material which comprises bringing a mixture of a substance containing the cellulose-xantho-fatty acid radical and a liquid in which said substance is soluble into the form of an artificial material and thereafter coagulating said mixture.

25. The process of producing artificial material which comprises bringing a mixture of a substance containing the cellulose-xantho-fatty acid radical and a liquid in which said substance is soluble into the form of an artificial material and thereafter producing the separation of dissolved substance.

26. The process of producing artificial material which comprises bringing a mixture of a substance containing the cellulose xanthacetic acid radical and a liquid in which said substance is soluble into the form of an artificial material and thereafter coagulating said mixture.

27. The process of producing artificial material which comprises bringing a mixture of a substance containing the cellulose xanthacetic acid radical and a liquid in which said substance is soluble into the form of an artificial material and thereafter producing the solidification of said mixture.

In testimony whereof I affix my signature.

LEON LILIENFELD.